Aug. 7, 1928.
W. J. SPIRO
1,679,796
FASTENING FOR RUNNING BOARD MOLDING
Filed Aug. 5, 1926
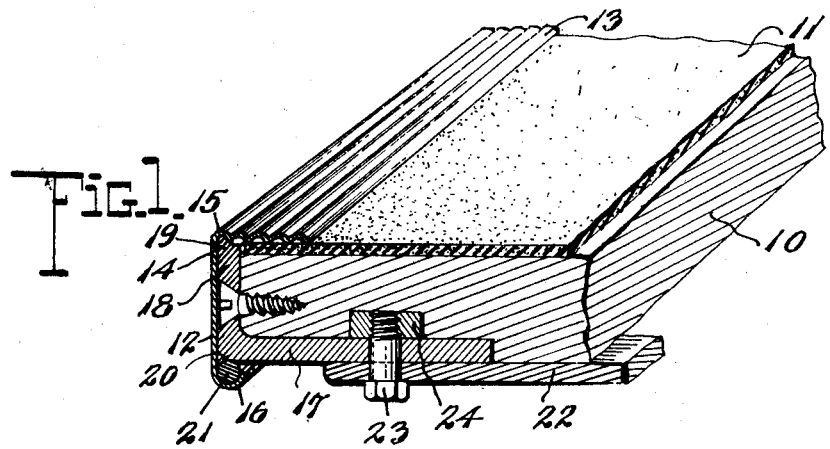
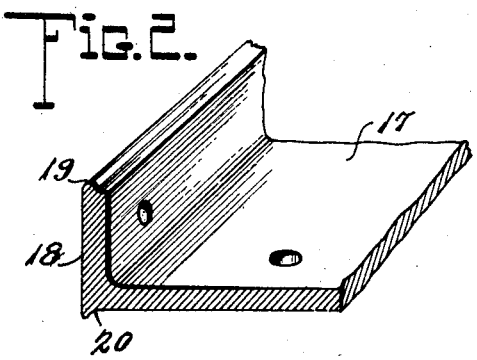
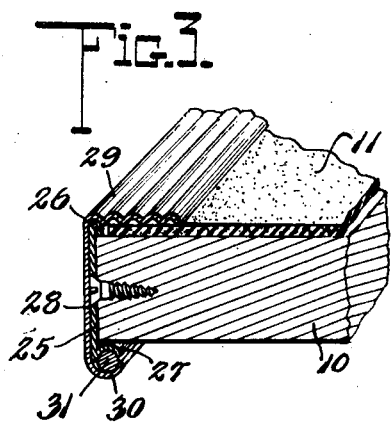
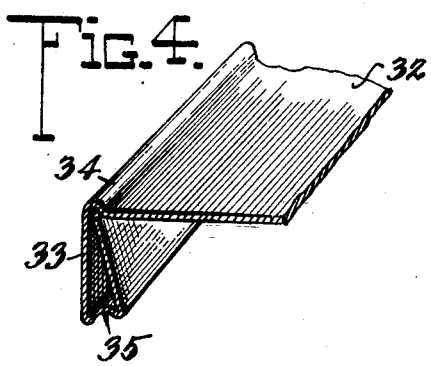
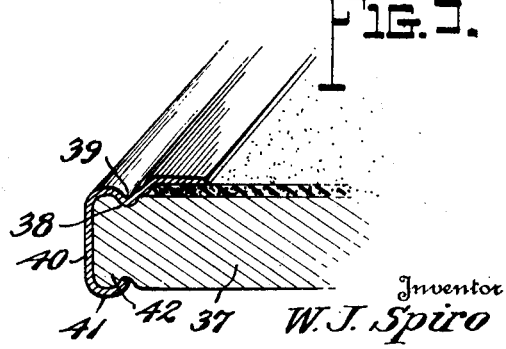
Inventor
W. J. Spiro
By Alfred T. Gage
Attorney Patented Aug. 7, 1928.

1,679,796

UNITED STATES PATENT OFFICE.

WALTER J. SPIRO, OF WHITE PLAINS, NEW YORK.

FASTENING FOR RUNNING-BOARD MOLDING.

Application filed August 5, 1926. Serial No. 127,329.

This invention relates to a fastening for running board molding, and particularly to a construction wherein the fastening means are concealed and molding strip adapted for simple and direct application to the edge of the board in position to retain the tread surface thereon.

In attaching moldings of this character it is usual to provide a number of separately applied fastening devices, such as screws or nails, which in most instances are exposed and frequently become loose and detached. It has also been found that in the event of a side blow against the automobile the running board being of light material is easily crushed which permits greater injury to the body of the vehicle or its occupants.

To obviate these objections I have provided a mounting for the molding strip which may comprise a reinforcing plate secured at the outer edge of the running board, and to which plate the strip is attached by interlocking engagement at one edge and a key device at the opposite edge thereof. This structure saves the expense and time of applying a series of fasteners while the securing means interlocked with the board are concealed and protected. The strip may be readily applied by engaging the upper portion with its interlocking connection upon the board and inserting the key at the lower portion of the strip beneath the board.

The invention has for an object to provide a novel and improved construction of strip having an interlocked connection at one edge with a member of the running board and a key device disposed between the opposite edge of the strip and the board.

Another object of the invention is to present a new structure of running board having at the upper portion of its free edge a projection and at the lower portion thereof a key seat, in connection with a molding strip having an inwardly disposed portion to engage over said projection and a key upon said seat.

A further object of the invention is to provide an improved construction of angular reinforcing plate mounted upon the free edge of a running board and provided at its upper vertical edge with interlocking means and at its lower edge with a key seat, a molding strip adapted to embrace both of said edges, and a sliding key disposed between the seat and one edge of the strip.

Other and further objects and advantages of the invention will be hereinafter set forth and the novel features thereof defined by the appended claims.

In the drawing—

Figure 1 is a sectional perspective of the invention applied;

Figure 2 is a similar view of the reinforcing plate;

Figure 3 is a detail section of a modified form;

Figure 4 is a like view of a further modification; and

Figure 5 is a section in perspective of another modification.

Like numerals refer to like parts in the several figures of the drawing.

The numeral 10 designates the running board which may be of any desired material and provided with the usual tread covering 11 which is retained in position at the free edge of the board by the molding strip 12. This strip may be formed from any preferred material or configuration and is ordinarily stamped or rolled from sheet metal. The upper portion of the strip is formed with an angularly disposed edge 13 overlapping the covering of the board and usually corrugated to provide a wear tread. Intermediate this edge and the front face 14 of the strip an interlocking recess 15 is formed, while the lower edge of the strip is bent inwardly and reversely to form a key way 16.

In the preferred application of the invention shown in Figure 1, the strip just described is mounted upon a reinforcing plate 17 of angular formation and having its vertical face 18 provided at the top with a rib 19 interlocking with the recess 15. At the base of said face a key seat 20 is disposed beneath the free edge of the running board. Cooperating with the key way and seat is a replaceable key 21 which may be formed in a plurality of sections and slidingly introduced from the opposite ends of the running board to secure the strip thereon without the use of separately applied screws or nails for such purpose. The plate 17 extends beneath the board 10 and is secured thereto in any desired manner to provide a rigid bumper member which prevents injury to the board and the body of the vehicle. The board may be supported by the usual bracket 22 from the vehicle frame secured by the bolt 23 engaging a nut 24 seated in the underface of the board.

In the modified form of the invention shown in Figure 3, the reinforcing plate 25 is applied only at the front edge of the board 10 and is formed with the interlocking rib 26 and the key seat 27. The molding strip 28 is provided with the recess 29 and key way 30 cooperating with a key 31, substantially as before described.

In Figure 4 the invention is shown as applied to a metal running board 32 having a depending front face 33 with rib 34 at the top and key seat 35 at the bottom to cooperate with the strip similar to that shown in Figure 1.

A further modification is shown in Figure 5 wherein the running board 37 is formed at its upper face with a recess 38 which interlocks with a rib 39 on the strip 40, constituting a reversal of the rib and recess shown in Figure 1. The lower edge of the strip is inwardly bent at 41 and embraces a fixed key device 42 at the under face of the board 37. In this form one edge of the strip may be engaged with the key and the other edge pressed inward until the rib and recess interlock.

The operation of applying the strip will be evident from the foregoing description and it will be seen that the cooperative relation between the strip and board obviates the use of separately applied fastening screws or nails for the strip, while the locking key is concealed and protected against injury or accidental displacement. This key exerts a downward pressure on the strip which draws the interlocking means at the top of the running board into engagement and also applies a tension to the free edge of the strip to grip the tread covering for the board. When used in connection with the reinforcing plate the running board becomes a side bumper and the molding strip fitting closely on the plate is not easily injured in the event of side-swiping contact or direct side blow. While the mounting on this plate is particularly desirable, still the molding strip may be supported directly from the running board, as in Figure 5.

The specific construction of the several parts of this invention have been shown and described for the purpose of clearness of disclosure, but the invention is not confined thereto, as changes and alterations may be made without departing from the spirit of the invention as recited in the following claims.

What I claim is—

1. A fastening for molding strips comprising a support having an interlocking member and a longitudinally movable key device at its opposite edges, and a molding strip formed with means engaging said member and device.

2. A fastening for molding strips comprising a support having an interlocking member at one edge and a key seat at its opposite edge, a molding strip formed to embrace said member and seat, and a separable key disposed between the strip and seat.

3. A fastening for molding strips comprising a support having a projection at its upper edge and a key seat at the lower edge thereof, a molding strip having an angularly disposed portion interlocked with said projection and an inwardly disposed free edge enclosing said seat, and a slidingly mounted key positioned between said free edge and seat.

4. A fastening for running board molding comprising a reinforcing plate secured to the board and having a projection at its upper edge and a key seat at its lower edge, a molding having inwardly bent portions to embrace said projection and seat, and a key retained between one of said portions and the seat.

5. A fastening for running board molding comprising an angular reinforcing plate embracing the bottom and front edge of the board, an interlocking projection at the upper edge of the vertical wall of the plate and a key seat at the lower edge thereof, an angular molding strip enclosing said projection and seat and bearing upon the upper surface of the board, and a key positioned upon said seat to tension the strip into engagement with said projection.

6. The combination of a running board provided with interlocking means and a retaining seat at its upper and lower faces, a molding strip having lateral edge portions to embrace said means and seat, and a separate retaining device adapted to be inserted between said seat and the adjacent edge of the strip.

7. The combination of a running board provided with interlocking and retaining means at its upper and lower faces, a molding strip formed to embrace both of said means and prevent movement of the strip laterally of the board, and means engaging said retaining means and constructed to effect a downward tension upon said strip.

In testimony whereof I affix my signature.

WALTER J. SPIRO.